B. M. DIVER.
AUTOMOBILE BODY CONSTRUCTION.
APPLICATION FILED MAR. 12, 1919.
1,339,325.
Patented May 4, 1920.
3 SHEETS—SHEET 3.
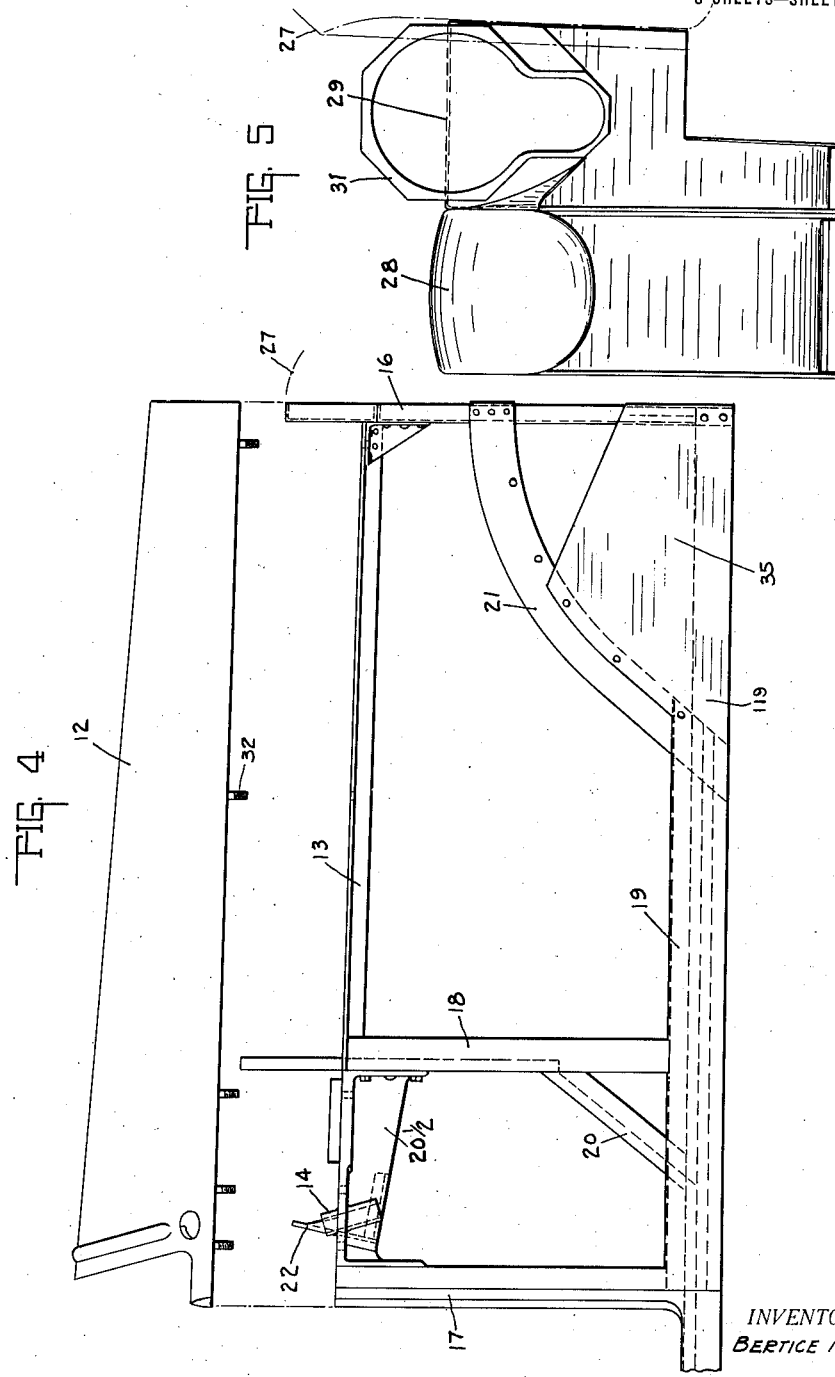
INVENTOR.
BERTICE M. DIVER.
BY
Lockwood & Lockwood
ATTORNEYS

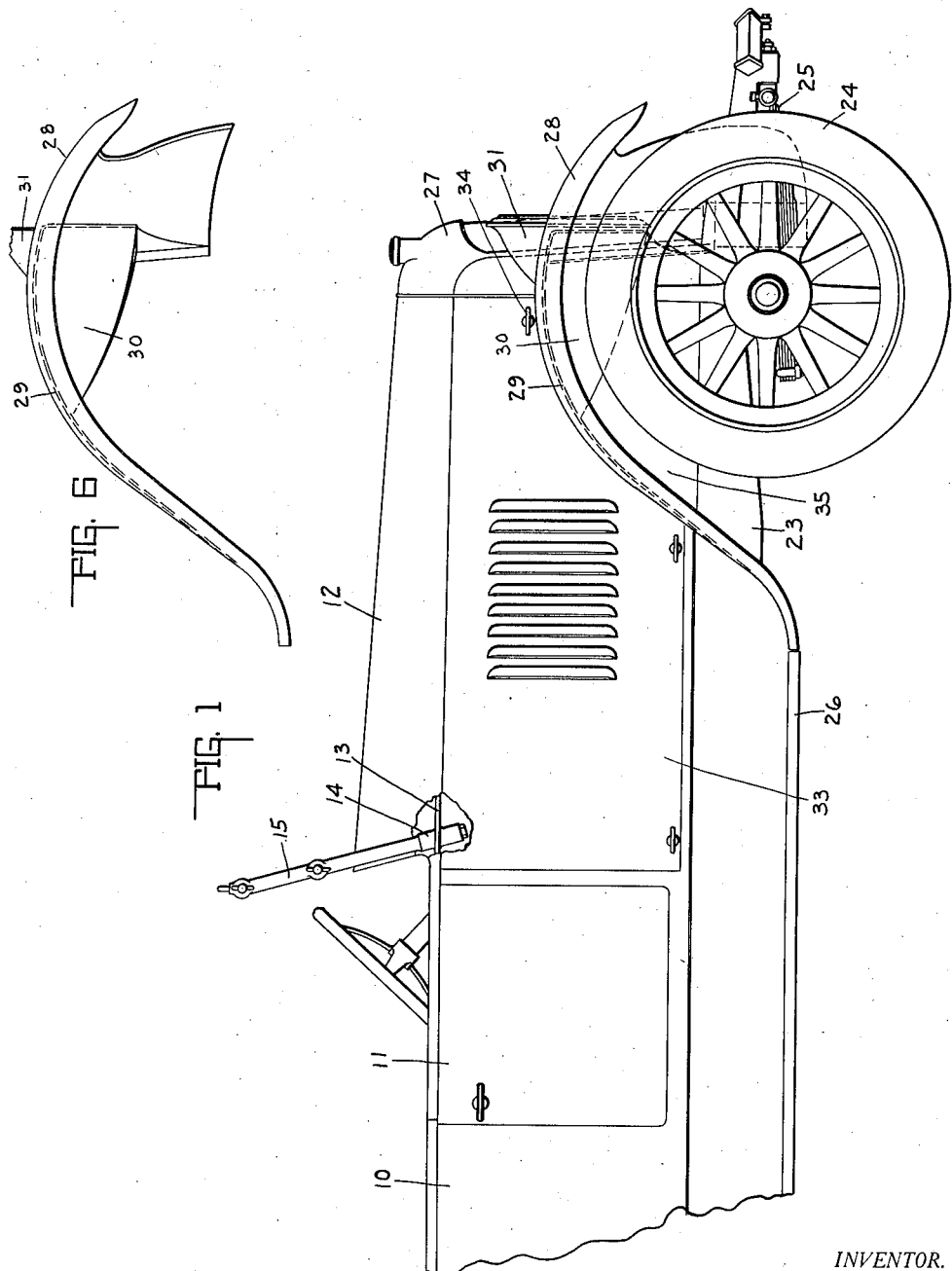

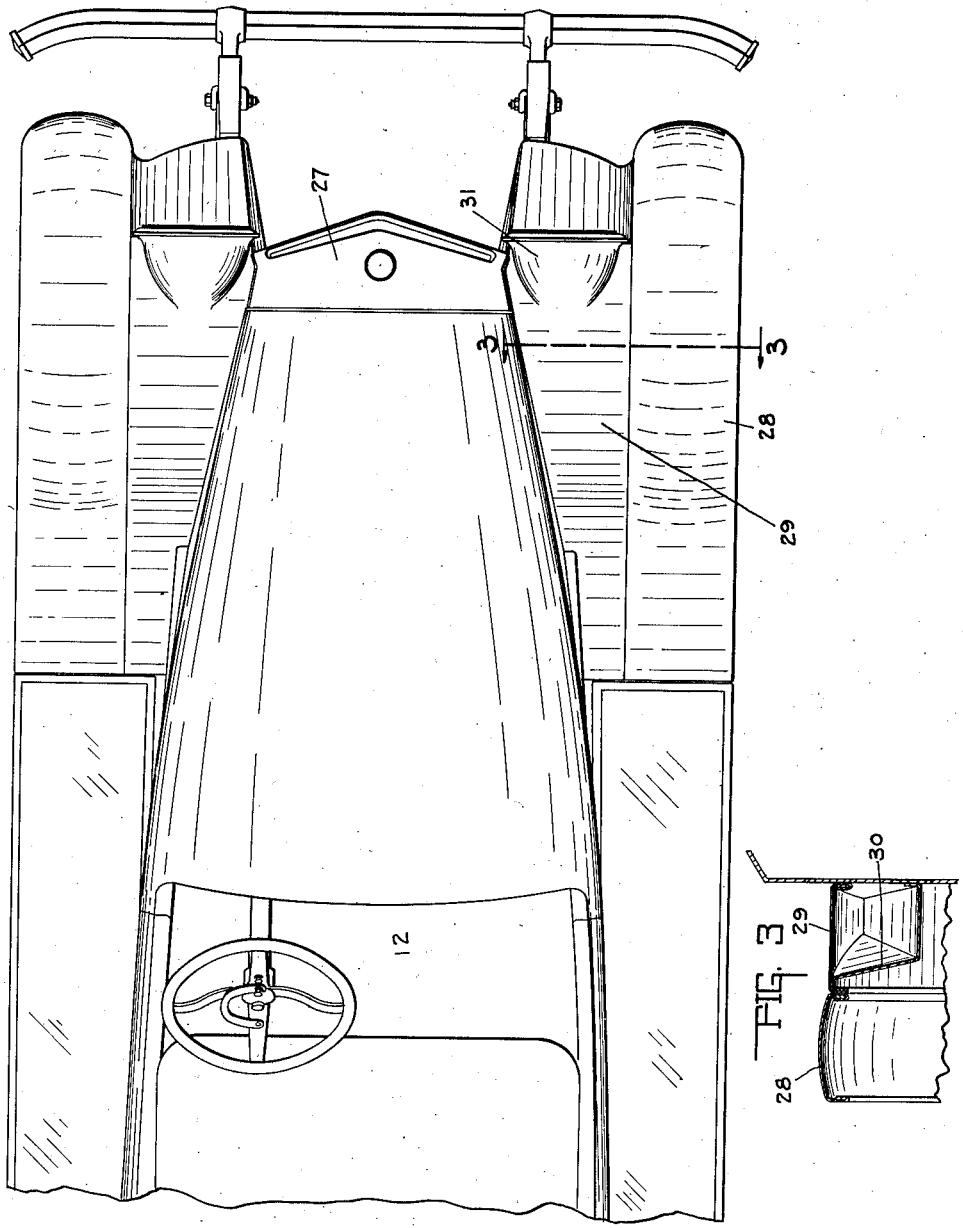

UNITED STATES PATENT OFFICE.

BERTICE M. DIVER, OF INDIANAPOLIS, INDIANA.

AUTOMOBILE-BODY CONSTRUCTION.

1,339,325.    Specification of Letters Patent.    Patented May 4, 1920.

Application filed March 12, 1919. Serial No. 282,202.

*To all whom it may concern:*

Be it known that I, BERTICE M. DIVER, a citizen of the United States, and a resident of Indianapolis, county of Marion, and State of Indiana, have invented a certain new and useful Automobile-Body Construction; and I do hereby declare that the following is a full, clear, and exact description thereof, reference being had to the accompanying drawings, in which like numerals refer to like parts.

This invention relates to a new construction of automobile bodies and fenders, the main object of which is to build a substantial and solid body including the hood, fenders and lamps so as to strengthen the body and make it rigid, solid and continuous from the rear end of the automobile to the radiator.

Another object of this invention is to so construct this unit body in such a way that the motor will be readily accessible, but will not take away from the solid appearance and strength thereof.

This is accomplished by providing side doors to the hood portion of the body and hinged to the frame, whereby the motor will be temporarily accessible when said doors are lifted, and providing a hood frame construction rigidly connected with the main body frame to which the side doors are hinged. For covering the hood frame inclosing the hood portion of the body there is provided a top hood cover and cowl formed of a single integral piece which may be adjustably secured to the frame so as to give the appearance of solidity and continuity.

In the accompanying drawings which are made a part of this application Figure 1 is a side elevation of a front portion of the automobile. Fig. 2 is a plan view of the front portion thereof. Fig. 3 is a cross section taken on the line 3—3 of Fig. 2, on a reduced scale. Fig. 4 is a side elevation of the front portion of the body frame. Fig. 5 is a front elevation of the fender and lamp. Fig. 6 is a front elevation of the fender and apron.

There is shown in the drawings an automobile having a body 10 with a door 11, and a combined hood and cowl inclosing top 12. As the hood top embodies both the cowl and upper portion of the hood, an appearance of rigidity of construction is imparted to the forward portion of the body. Forming part of the body frame and rigidly fixed thereto, there is a hood frame surrounding the motor, formed of longitudinal supporting frame members 13 in which there are wind shield sockets 14, which supports the wind shield frame 15. Upon the front end of the hood frame there is a forward cross member 16 to which the radiator is securely fixed, and on the rear of said frame there is a rear vertical member 17 on which the body 10 is rigidly secured, and which forms a part of the main body frame.

A vertical frame member 18 is rigidly secured to the base plate 19 and the longitudinal members 13 for engaging the doors 33 and separating the motor or hood compartment from the interior of the body. The base plates 19 are integral with the shields 35 and formed of sheet metal secured to the fender members 21 and extending rearwardly upon the base member 119 of the main body frame to the body 10, upon which are closed and secured the lower edge of the hinged doors 33. The base members 119 of the main body frame extend longitudinally from the cross member 16 to the rear of the body, and are formed of one single continuous bar.

The hood frame also includes the foot board frames 20 and the cowl frame 20½ for supporting the foot boards and the cowl respectively, and reinforcing the frame construction. Rigidly secured to the cowl frame 20½ there is an instrument board 22. The entire hood frame embodying the various members specified constitutes a rigid portion of the main body frame, so as to form one continuous frame structure.

The chassis of the automobile is formed of the chassis frame 23, wheels 24, springs 25, running board 26 and radiator 27. The base members 119 of the body frame are rigidly secured to the chassis frame 23.

A further portion of the body may be said to be the fenders and lamps. Instead of the fenders extending downwardly and being secured to the chassis frame as in all prior constructions, they extend directly across and are securely fixed to the hood frame. The fenders 28 are rounded in cross section as shown in Fig. 3 and securely fixed to the horizontal aprons 29 which extend directly across and are secured to the fender members 21. The fenders and aprons are further braced by a bracket 30 which is secured to the shields 35 and fender members 21. The head lamps 31 form a part of, and are integral with the aprons 29 so as, to all appearances, form a part of the fenders. However, the fenders being detachable from the aprons, may be replaced if dented or disfigured without the necessity of replacing the lamps, as in the case in fenders having the lamps actually forming a part thereof. It will be seen therefore that although the fenders, aprons, and hood top are removable from each other and from the main body portion, they are all formed and secured so rigidly to each other upon the same frame that they form a continuous body construction including all of those elements so far as both appearance and solidity are concerned.

The hood top 12 or the body is removably secured to the permanent hood frame as shown in Fig. 4, by means of a plurality of bolts 32 or similar securing means. The side doors 33 which open into the side of the motor for temporarily obtaining access thereto, are hinged in the ordinary and well known invisible manner to the longitudinal members 13, and are locked in closing position by the locking members 34 upon the base plates 19. The doors extend only to the fenders and not beyond the frame member 21. In addition to being raised on hinges, the doors 33 may be demountable so as to enable them to be entirely removed from the hood frame. The protecting shield 35 is secured to the front portion of the hood frame as shown in Fig. 4, and permanently fixed thereto, which takes the place of that portion of the fender apron and hood of the common type of construction.

The continuous and rigid body, including the hood, fenders, and lamps permits the motor to be temporarily accessible by raising or removing the side doors 33, and if it is desired to have access to the entire motor or for removing the motor from the chassis, the bolts 32 are loosened, the wind shield removed, and the entire hood top 12 lifted from the frame.

The invention claimed is:—

1. The combination with the chassis of a motor driven vehicle, having a body frame including longitudinal base members, and a body secured to said frame having a hood portion in the forward end thereof, of means for inclosing said hood portion comprising a hood and cowl top formed of a single piece adapted to be removably secured on the hood portion of said frame for inclosing the top thereof, and a hinged door mounted on the side of the hood portion of said frame for inclosing the sides thereof and permitting access to the inside thereof when said door is raised.

2. The combination with the chassis of a motor driven vehicle, having a body frame including longitudinal base members, and a body secured to said frame having a hood portion in the forward end thereof, of means for inclosing said hood portion comprising a hood top formed of a single piece of sheet metal, means for detachably securing said hood top to the hood portion of said frame for permitting its removal therefrom, inclosing doors mounted on the sides of the hood portion of said frame for normally inclosing said portion in conjunction with said hood top, said doors being so arranged as to permit their removal from said hood portion for permitting access to be had to the interior thereof.

3. The combination with the chassis of an automobile, of a body frame, longitudinal frame members forming a part of said body frame, a body secured on said frame, a cowl and hood top detachably secured over the forward end of said frame, said cowl and hood top being formed of one integral and continuous member, means for rigidly and removably securing said cowl and hood top to said frame, and side members mounted on said frame so as to permit access to the inside thereof.

4. The combination with a chassis of an automobile, of a hood and cowl construction consisting of longitudinal base members, upright cross members fixedly secured on said base members, upper longitudinal frame members mounted on said upright members, side doors hingedly mounted on said upper members so as to form the sides of the motor hood, and a hood top portion adapted to be removably mounted on said upper members for forming the top portions of the hood and cowl, whereby the top of said hood and cowl may be formed of a single integral member which may be removable from said frame.

5. The combination with a chassis of an automobile, of a hood and cowl construction consisting of longitudinal base members, upright cross members fixedly secured to the forward ends of said base members, upper longitudinal frame members mounted on said upright members, fender members, fenders having laterally extending aprons thereon adapted to be fixedly secured directly on said fender members, said doors being hingedly mounted on said upper members so as to form the sides of the motor hood, and a hood top portion adapted to be removably mounted on said upper members for forming the top portions of the hood and cowl, whereby the top of said hood and cowl may be formed of a single integral member which may be removable from said frame.

6. The combination with the chassis of an automobile having a body mounted thereon, and a hood portion, of means for inclosing said hood portion including frame members mounted on said chassis, a hood top formed of a single piece of material adjustably secured to the frame members for covering the top of the hood portion, and side members removably mounted on said frame members independently of said hood top so as to inclose the sides of said hood portion, whereby access may be had to the inside of said hood portion by removing either the hood top, side members or both.

In witness whereof, I have hereunto affixed my signature.

BERTICE M. DIVER.